US008949565B2

(12) United States Patent
Khosravi et al.

(10) Patent No.: US 8,949,565 B2
(45) Date of Patent: Feb. 3, 2015

(54) VIRTUAL AND HIDDEN SERVICE PARTITION AND DYNAMIC ENHANCED THIRD PARTY DATA STORE

(75) Inventors: Hormuzd M. Khosravi, Portland, OR (US); Yasser Rasheed, Beaverton, OR (US); Venkat R. Gokulrangan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 964 days.

(21) Appl. No.: 12/647,538

(22) Filed: Dec. 27, 2009

(65) Prior Publication Data

US 2011/0161551 A1    Jun. 30, 2011

(51) Int. Cl.
*G06F 12/00*    (2006.01)
*G06F 21/80*    (2013.01)
*G06F 9/50*    (2006.01)

(52) U.S. Cl.
CPC .............. *G06F 21/80* (2013.01); *G06F 9/5077* (2013.01)
USPC ................... 711/163; 711/162; 711/E12.037; 711/E12.041; 711/E12.07; 711/E12.076; 707/640; 707/641; 707/644; 707/645; 707/646; 707/647; 707/648; 707/650; 707/651; 707/682

(58) Field of Classification Search
None
See application file for complete search history.

(56) References Cited

U.S. PATENT DOCUMENTS

| | | | | |
|---|---|---|---|---|
| 5,826,012 | A * | 10/1998 | Lettvin | 726/22 |
| 6,134,641 | A * | 10/2000 | Anand | 711/202 |
| 6,449,625 | B1 * | 9/2002 | Wang | 1/1 |
| 6,647,499 | B1 * | 11/2003 | Morcom | 713/300 |
| 6,768,985 | B1 * | 7/2004 | Plasek et al. | 1/1 |
| 6,792,556 | B1 * | 9/2004 | Dennis | 714/6.11 |
| 6,839,824 | B2 * | 1/2005 | Camble et al. | 711/173 |
| 6,845,431 | B2 * | 1/2005 | Camble et al. | 711/152 |
| 6,915,420 | B2 * | 7/2005 | Hensley | 713/2 |
| 7,043,665 | B2 * | 5/2006 | Kern et al. | 714/5.11 |
| 7,085,899 | B2 * | 8/2006 | Kim et al. | 711/161 |
| 7,111,292 | B2 * | 9/2006 | Bonnett et al. | 717/171 |
| 7,136,973 | B2 * | 11/2006 | Sinclair | 711/156 |
| 7,146,525 | B2 * | 12/2006 | Han et al. | 714/6.11 |
| 7,155,615 | B1 * | 12/2006 | Silvester | 713/185 |
| 7,222,339 | B2 * | 5/2007 | Rothman et al. | 717/168 |

(Continued)

OTHER PUBLICATIONS

Patrick Schmid et al., (USB Flash Drive: Super Talent Pico C Gold USB 8 GB), Sep. 11, 2008, pp. 1-6, http://www.tomshardware.com/reviews/usb-hard-drive,2015-4.html.*

(Continued)

*Primary Examiner* — Edward Dudek, Jr.
*Assistant Examiner* — Christopher Birkhimer
(74) *Attorney, Agent, or Firm* — Blakely, Sokoloff, Taylor & Zafman LLP

(57) ABSTRACT

A system reserves and manages a hidden service partition through components of the hardware platform of a computing device. The hidden partition is not accessible by way of a host operating system on the computing device. A hardware platform controller provisions a portion of nonvolatile storage through configuration settings of the hardware platform controller. When the host system requests settings related to storage in the system, the request is routed through the interfaces of the hardware platform, and the hardware platform controller reports in accordance with the configuration settings, hiding the service partition. The hidden partition is dynamically modifiable through secure remote access to the hardware platform controller, not through the host system such as operating system or BIOS.

24 Claims, 7 Drawing Sheets

(56) References Cited

U.S. PATENT DOCUMENTS

| | | | |
|---|---|---|---|
| 7,305,577 B2* | 12/2007 | Zhang | 714/6.11 |
| 7,370,166 B1* | 5/2008 | Ramesh et al. | 711/163 |
| 7,380,074 B2* | 5/2008 | Pepper | 711/152 |
| 7,389,394 B1* | 6/2008 | Karr et al. | 711/162 |
| 7,406,473 B1* | 7/2008 | Brassow et al. | 1/1 |
| 7,577,806 B2* | 8/2009 | Rowan et al. | 711/162 |
| 7,577,807 B2* | 8/2009 | Rowan et al. | 711/162 |
| 7,584,337 B2* | 9/2009 | Rowan et al. | 711/162 |
| 7,606,219 B2* | 10/2009 | Wheeler et al. | 370/352 |
| 7,620,765 B1* | 11/2009 | Ohr et al. | 711/4 |
| 7,792,882 B2* | 9/2010 | Moore et al. | 707/822 |
| 7,870,128 B2* | 1/2011 | Jensen et al. | 707/727 |
| 2003/0051090 A1* | 3/2003 | Bonnett et al. | 711/1 |
| 2003/0126395 A1* | 7/2003 | Camble et al. | 711/173 |
| 2004/0078514 A1* | 4/2004 | Kung et al. | 711/105 |
| 2004/0117585 A1* | 6/2004 | Glider | 711/202 |
| 2004/0260899 A1* | 12/2004 | Kern et al. | 711/162 |
| 2005/0015652 A1* | 1/2005 | Han et al. | 714/6 |
| 2005/0076264 A1* | 4/2005 | Rowan et al. | 714/6 |
| 2005/0125607 A1* | 6/2005 | Chefalas et al. | 711/113 |
| 2005/0289218 A1* | 12/2005 | Rothman et al. | 709/203 |
| 2006/0112219 A1* | 5/2006 | Chawla et al. | 711/114 |
| 2006/0206666 A1* | 9/2006 | Lambert et al. | 711/115 |
| 2006/0253673 A1* | 11/2006 | Lee et al. | 711/163 |
| 2007/0083719 A1* | 4/2007 | Emerson et al. | 711/150 |
| 2007/0130414 A1* | 6/2007 | Ni et al. | 711/103 |
| 2007/0168606 A1* | 7/2007 | Takai et al. | 711/113 |
| 2007/0271438 A1* | 11/2007 | Lee et al. | 711/173 |
| 2008/0147970 A1* | 6/2008 | Sade et al. | 711/113 |
| 2008/0168247 A1* | 7/2008 | Goodwill et al. | 711/163 |
| 2008/0266129 A1* | 10/2008 | Chiang | 340/686.1 |
| 2008/0266257 A1* | 10/2008 | Chiang | 345/163 |
| 2008/0270724 A1* | 10/2008 | Ramesh et al. | 711/163 |
| 2009/0089343 A1* | 4/2009 | Moore et al. | 707/205 |
| 2009/0172206 A1* | 7/2009 | Hall et al. | 710/10 |
| 2009/0172280 A1* | 7/2009 | Trika et al. | 711/115 |
| 2009/0193178 A1* | 7/2009 | Warren et al. | 711/103 |
| 2009/0210611 A1* | 8/2009 | Mizushima | 711/103 |
| 2009/0216920 A1* | 8/2009 | Lauterbach et al. | 710/36 |
| 2009/0221363 A1* | 9/2009 | Brunet de Coursou et al. | 463/25 |
| 2009/0295738 A1* | 12/2009 | Chiang | 345/173 |
| 2010/0281230 A1* | 11/2010 | Rabii et al. | 711/165 |
| 2010/0332813 A1* | 12/2010 | Rothman et al. | 713/2 |
| 2013/0007729 A1* | 1/2013 | Sirotkin | 718/1 |

OTHER PUBLICATIONS

Webopedia, (BIOS), Sep. 1, 1996, pp. 1-5, http://web.arch ive.org/web/20010407102532/http://webopedia.com/TERM/B/BIOS.html.*

* cited by examiner

VIRTUAL AND HIDDEN SERVICE PARTITION AND DYNAMIC ENHANCED THIRD PARTY DATA STORE

FIELD

Embodiments of the invention are generally related to storage device management on a computing device, and more particularly to provisioning of partitions on the storage device.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2009, Intel Corporation, All Rights Reserved.

BACKGROUND

The pervasiveness of computing devices has increased the need and attention given to security of the devices. Besides the need to design and implement hardware and software that works compatibly in increasingly complex systems, designers must account for security issues due to external sources and to failures of the system itself. External security issues may be caused, for example, by viruses, worms, phishing attempts, or other security attacks or potential security compromises. Failures of the system itself or internal security issues may be caused, for example, by system errors, bugs, incompatibility issues, or other design or implementation issues.

One effort to allow for the prevention of and reaction to system errors is the use of a service partition on the computing device. Service partitions may be reserved or provisioned in a number of different ways. However, traditional systems typically all have access to service partitions through the host system, such as through the operating system. Thus, if the host system becomes compromised, the security of the service partition is suspect.

Some systems support the use of a third (or 3rd) party data store (3PDS). For example, systems available from Intel Corporation of Santa Clara, Calif. provide 3PDS. However, current 3PDS and service partition solutions are frequently small (e.g., a 192 KB partition on many Intel systems), and inflexible. Splitting the partition among multiple ISVs (independent software vendors, or vendors that produce software to execute on a platform) may provide too little storage to be very useful. In addition to inflexibility with the configuration of the partition, the partitions may have static interfaces that are not convenient in their usability for the ISVs.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a system reserves and manages a hidden service partition through components of the hardware platform of a computing device. The hidden service partition may be a virtual partition provided by a hardware platform controller. The hidden partition is not accessible by way of a host operating system on the computing device. A hardware platform controller provisions a portion of nonvolatile storage through configuration settings of the hardware platform controller. When the host system requests settings related to storage in the system, the request is routed through the interfaces of the hardware platform, and the hardware platform controller reports in accordance with the configuration settings, hiding the service partition. The hidden partition is dynamically modifiable through secure access to the hardware platform controller, not through the host system (such as operating system or BIOS (basic input/output system)).

In one embodiment, the virtual and hidden partition is provided through Intel AMT (Active Management Technology) hardware. All trademarks used herein are the property of their respective owners, and are used solely for purposes of identifying the source of products that may be suitable in certain implementations. In one embodiment, the virtual and hidden partition described herein may be referred to as an enhanced 3PDS (third party data store) or E-3PDS. Through the leveraging of the AMT hardware, E-3PDS can be provided in a computing device with no additional hardware costs. E-3PDS can provide additional storage (up to 1000 times greater) than current 3PDS solutions, while also providing configuration flexibility and improved interfacing.

The configuration of the service partition can be more flexible with dynamic configurability of the partition. Rather than having a fixed partition, the system as described herein can dynamically configure the partition size and configuration parameters. Thus, if more or less storage than is currently configured is desired, a service provider can remotely access and reconfigure the partition. Additionally, in one embodiment, the interface can be improved by appearing more like a remote mount. Thus, the interface would tend to be more familiar and easier to work with.

Figure 1:
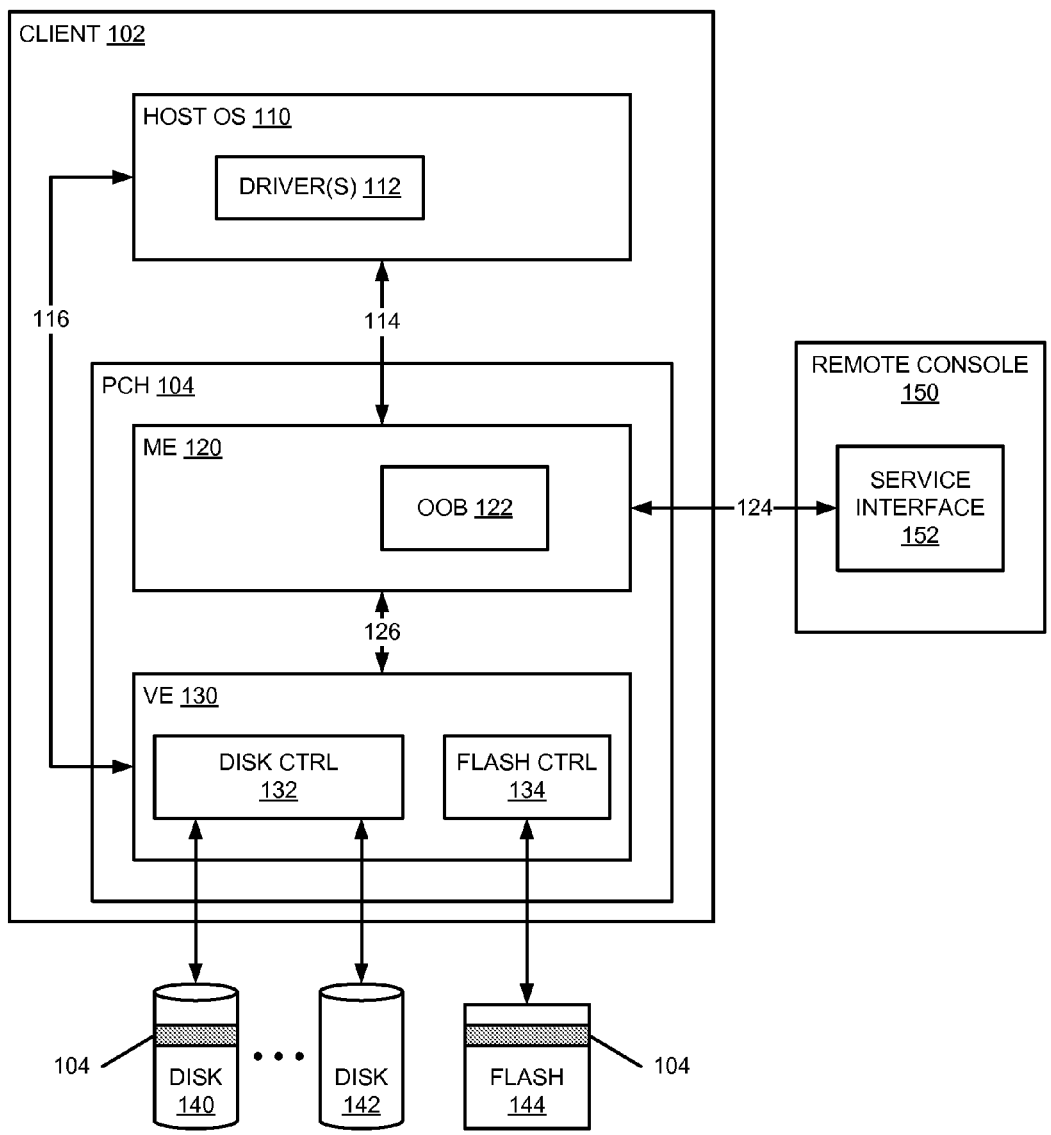
FIG. 1 is a block diagram of an embodiment of a system that reserves a hidden partition by way of the system platform.

FIG. 1 is a block diagram of an embodiment of a system that reserves a hidden partition by way of the system platform. System 100 includes computing device 102, which is a computing system on which the components that provide a hidden virtual partition are implemented. As used herein, the partition as described may be referred to as a hidden partition, a virtual partition, a hidden virtual partition, or a service partition. While there may be differences in the partition based on the term used as would be understood from context, in general the partition is a partition that cannot be directly accessed via a host system, provides storage for manageability applications, and is remotely accessible through a secure out-of-band connection. Computing device 102 may also be referred to as a "client" or a client device, referring to a relationship with a remote server entity represented by remote console 150.

Figure 7:
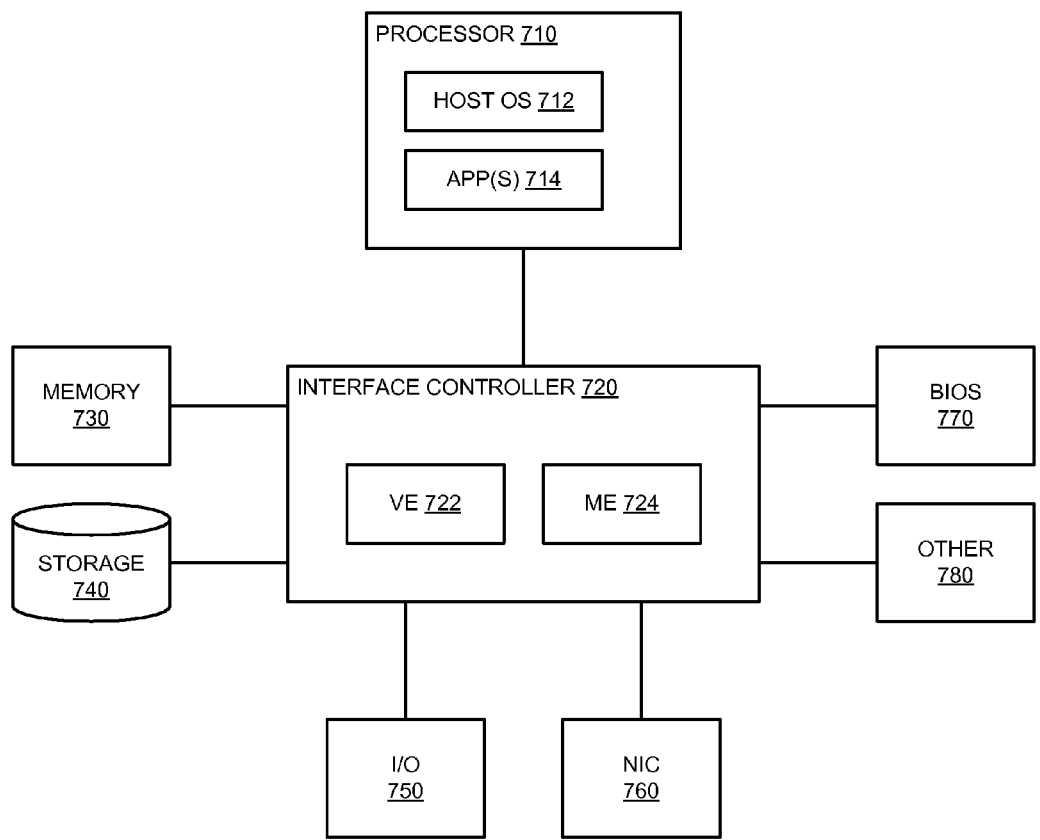
FIG. 7 is a block diagram of an embodiment of a hardware platform of a system that reserves a hidden partition.

Device 102 is represented with functional blocks illustrating features of the device. System 700 of FIG. 7 is one embodiment of a comparable system as viewed from the perspective of the hardware components. Device 102 includes host operating system (OS) 110, which executes on processing resources of the computing device. Host OS 110 directs the logical flow of operation of instructions, and thus provides a software platform on which or under which other software components can be executed. Host OS 110 includes one or more drivers 112, which enable software components to interface with hardware components of device 102. More particularly as illustrated, driver(s) 112 enables communication with one or more components of platform control/controller hub (PCH) 104.

PCH 104 provides a hardware platform through which any of a number of different peripheral devices may have access to the processing resources and associated host OS 110. Peripheral devices may include memory, network interface circuits, storage devices, I/O (input/output) devices, external connection buses (e.g., USB (universal serial bus), Firewire, or other connections), or other components that can be interfaced with the processor. In one embodiment, PCH 104 may include elements of what has been previously known as MCH (memory controller hub) and/or ICH (I/O controller hub). In one embodiment, PCH 104 may be referred to as a "chipset" that provides the hardware interface platform to support integration of the processing resources with other hardware resources of the computing device.

In one embodiment, PCH 104 includes manageability engine (ME) 120 and virtualization engine (VE) 130, or equivalents. An equivalent component would be any component that provides a comparable functionality, whether as a single or separate component, or as a component combined with other functionality. ME 120 and VE 130 are described in more detail with respect to FIGS. 2A and 2B, respectively. Briefly, for purposes of what is described herein, ME 120 provides management of the hidden virtual partition, and VE 130 performs operations related to changing configuration settings within the hardware platform to hide the partition from the host system.

ME 120 may provide other services in other contexts, which are not described herein. As part of the management of the hidden virtual partition, ME 120 includes OOB 122, which represents out-of-band communication for PCH 104. OOB 122 refers to any mechanism that provides a communication channel to an entity external to device 102, which communication channel is hidden from the host system and not directly accessible from the host OS or a component executing under the host OS. In one embodiment, OOB 122 is implemented through configuration of the network interface circuit or card (NIC) of device 102. The OOB connection can be made over the same medium (e.g., over a cable or wirelessly) that the host system uses to communicate, but is hidden to the host system.

VE 130 generally manages establishing the partition virtually. The virtual nature of the partition prevents the need for additional hardware in the system. Thus, no additional hardware is required on the physical media themselves (the disk and/or flash), and no additional hardware is required on device 102 aside from what is included for ME 120 and VE 130. In one embodiment, hardware for ME 120 and VE 130 is the hardware of PCH 104, which may execute firmware or code on the hardware platform component(s) to execute the functions of ME 120 and VE 130. VE 130 includes disk control (ctrl) 132 and flash control 134. Disk control 132 includes hardware to interface with disks of device 102, such as disks 140-142. Similarly, flash control 134 includes hardware to interface with flash 144. Disks 140-142 represent hard drives of device 102, while flash 144 represents a flash device on the hardware platform. Such a flash device may store the BIOS of the system, as well as provide storage for manageability applications.

As seen in FIG. 1, there is a strip 104, which represents the hidden virtual partition. In one embodiment, the partition is created in both the disk 140 and flash 144, and the two copies are synchronized. The synchronization may occur at the time of or as part of a state transition between low power operation and normal power operation. In response to an indication in the platform to transition states, the data may be synchronized between the flash and the disk. There may not be a copy of partition 104 in flash 144, but only on disk 140.

System 100 also includes remote console 150, which represents a device remote to device 102. Remote console 150 is "remote" to device 102 in that it is a separate device that has its own control logic, and the devices can be connected over a "network" connection. While there may be geographic separation, no specific physical distance is required to make the devices remote from each other. Device 102 may connect with any known protocol that allows device 102 to communicate with remote console 150 over a network connection. The network connection is the OOB connection managed through OOB 122, and represented by link 124. Service interface 152 provides an interface to allow a user of remote console 150 to interact with device 102. Service interface 152 may include protocol stacks as well as user interfaces, in addition to hardware necessary to connect to device 102 through OOB link 124. In one embodiment, remote console 150 manages hidden partitions via OOB link 124. Thus, remote console 150 can provide instructions, commands, requests, or other communication over the link to remotely manage one or more hidden partitions. It will be understood that different sections of a hidden partition may be used by different remote entities; thus, multiple remote consoles may be connected to device 102. Multiple remote consoles would not necessarily be concurrently connected to device 102, but there may be more than one connected to device 102.

System 100 represents various connections, which provide interfaces between various components. OOB link 124 is discussed above. Additionally, host OS 110 connects to the hardware platform (PCH 104) via links 114 and 116. It will be understood that host OS 110 interfaces with hardware components via driver 112 over communication interfaces to the components. In one embodiment, specific interfaces may be used to connect hardware to host OS 110. Thus, in one embodiment, link 114 is a HECI (host extensible control interface) link and link 116 includes VECI (virtualization engine control interface) and/or AHCI (advanced host control interface or advanced-technology host control interface) links. Alternatively to a VECI interface could be any appropriate interface that interfaces with a USB or other peripheral storage bus. Alternatively to an AHCI interface could be any appropriate interface that interfaces with SATA (serial advanced technology attachment) or hard drive control. Link 126 represents any appropriate link to interconnect ME 120 with VE 130. In some embodiments, there may be a single component that performs both functions, which may eliminate the need for a specific interface. In one embodiment, link 126 includes a MECI (manageability engine control interface) link.

While certain details have been described with specific reference to system 100, it will be understood that the details may provide non-limiting examples. In general, a system to create and manage a virtual hidden partition is provided through mechanisms in the hardware platform interface. The virtual hidden partition is a persistent, nonvolatile memory space available for manageability applications. Such a virtual hidden partition may be a 3PDS. The partition is hidden, and thus is not susceptible to attack or failure of the host system or software operating under the host system. Thus, even when the OS is unresponsive or management agents are missing, the partition can still be accessed, and manageability applications can be executed from the partition on the platform hardware. The partition may be commonly used to store data such as software version numbers, update history, pointers to database information, application configuration information, or any other data. Via the OOB link, a service administrator (e.g., IT (information technology) administrator) can upload data to the partition to reduce reliance on local software agents that execute under the host OS, and can store and retrieve data to reduce the risk of accidental data loss.

Security on the OOB link can be enforced, for example, through access control lists (ACLs) that enforce access to the storage space of the partition, to prevent access from anyone other than an authorized remote device or application. Encryption, keys, or other security mechanisms may also be used.

The hidden virtual partition is reserved in nonvolatile storage on the host computing device. Nonvolatile storage retains information even in the event of an interruption of power to the storage device. The partition may be reserved in a hard drive (whether conventional magnetic disk, or solid state (SSD)), as well as on a flash device on the hardware platform. In one embodiment, the partition is one segment of a nonvolatile storage device that is part of AMT. The three segments may include ME storage and code, system information and BIOS configuration and event logs, and the hidden partition.

By using mechanisms in the hardware platform, such as through an ME and a VE, the partition functionality is considered OS independent. Regardless of what OS is loaded and executes on the computing device, the hidden virtual partition can be reserved and managed. The hardware platform reports storage configuration of the computing device, and excludes information related to the hidden virtual partition. Thus, the OS would be unaware of the presence of the hidden partition.

The hidden virtual partition can be accessed remotely as described above. In one embodiment, the partition can be accessed in low power states of the hardware platform. Thus, if the hardware platform supports low power or power-down states, information such as DAT file version for antivirus (AV) software, or patch level of the OS can be stored and accessible. With low power access, an IT administrator or remote ISV (independent software vendor, being an entity other than the entity that produces the hardware platform) can access information stored in the hidden virtual partition even when the system is in sleep mode or turned off (powered down).

There is no theoretical limit to the size of the hidden virtual partition. For example, in a dummy terminal mode, the entire nonvolatile storage of a device could be provisioned as a hidden virtual partition. As a practical limit, there may be a limit imposed, such as 1% or 10% of total system capacity, which can be reserved as a hidden virtual partition. It will be understood that such limits are purely arbitrary. However, reserving a size of 1 to 2 GB of storage (out of 100-300 GB of typical storage) may provide adequate storage on current systems. Comparable increases could be made as system storage increases. The hidden virtual partition may be divided among multiple ISVs or remote administrators.

Rather than being fixed in size as known service partitions or 3PDS implementations, in one embodiment, the mechanisms described herein allow for dynamic configuration of the partition. Thus, the size of the partition may not be fixed, but more or less storage can be reserved even in a deployed computing device. Dynamically changing the configuration can be accomplished by changing or altering the configuration settings within the platform components. The settings can be changed through request to the platform components, through the secure OOB connection discussed above.

In addition to being dynamically configurable, in one embodiment, the mechanisms to configure and manage the hidden virtual partition enable a management interface that provides access to the partition as a remote mount. It will be understood that a remote mount can be accessed through a filesystem on a remote system. Thus, the hidden virtual partition on a computing device can appear as a storage device through a filesystem interface local to an accessing remote console. Remotely mounting the partition provides a more flexible interfacing of the partition than previously available through accessing the partition via the local host system (e.g., via a host OS or BIOS) as in traditional systems.

Figure 2A:
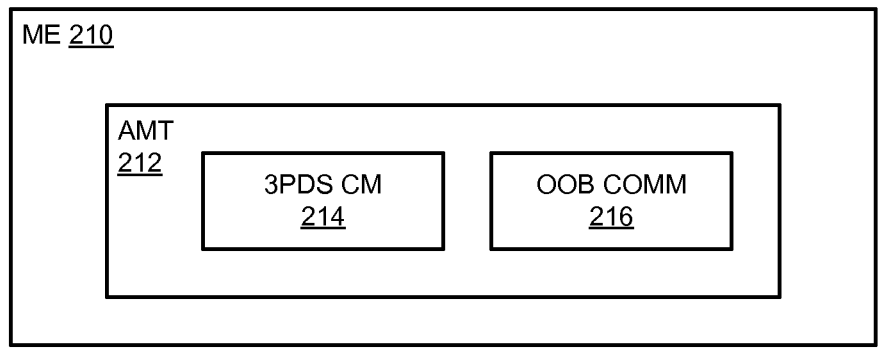
FIG. 2A is a block diagram of an embodiment of a manageability engine.

FIG. 2A is a block diagram of an embodiment of a manageability engine. ME 210 is one example of a potential implementation of a manageability engine. Other implementations are possible. In one embodiment, ME 210 is firmware, or code that executes on one or more processing components of the peripheral controller of a computing device. In one embodiment, ME 210 includes AMT capability module 212. In turn, AMT 212 includes 3PDS capability module (CM) 214 and OOB communication module 216. As suggested above, a host system (e.g., host OS or host BIOS) may interface with ME 210 and AMT 212 for purposes other than accessing the hidden virtual partition described herein. In one embodiment, ME 210 executes on a component of the hardware platform, which may, for example, be accessed by the host system to determine what storage is available in the computing device.

3PDS CM 214 is an example of a capability module for accessing a hidden virtual partition, and implements functionality related to 3PDS or partition access. Access to the hidden virtual partition may include reads and writes into the 3PDS by a manageability application. Manageability applications execute under ME 210, and provide manageability functions (e.g., monitoring, security) for various hardware and/or software components on the computing device. In one embodiment, 3PDS CM 214 implements logic needed to access the hidden virtual partition inside the VE (e.g., VE 220 of FIG. 2B) over an interface between the ME and the VE (e.g., MECI). In addition to implementing the logic to access the partition, 3PDS CM 214 implements the remote interface needed for remote access to the partition. Thus, 3PDS CM 214 may provide a communication protocol stack to support OOB communication module 216. Alternatively, OOB communication module 216 could provide any necessary protocol stack. OOB communication module 216 provides the communication interface for interaction between ME 210 and a remote service interface (application or other service).

Figure 2B:
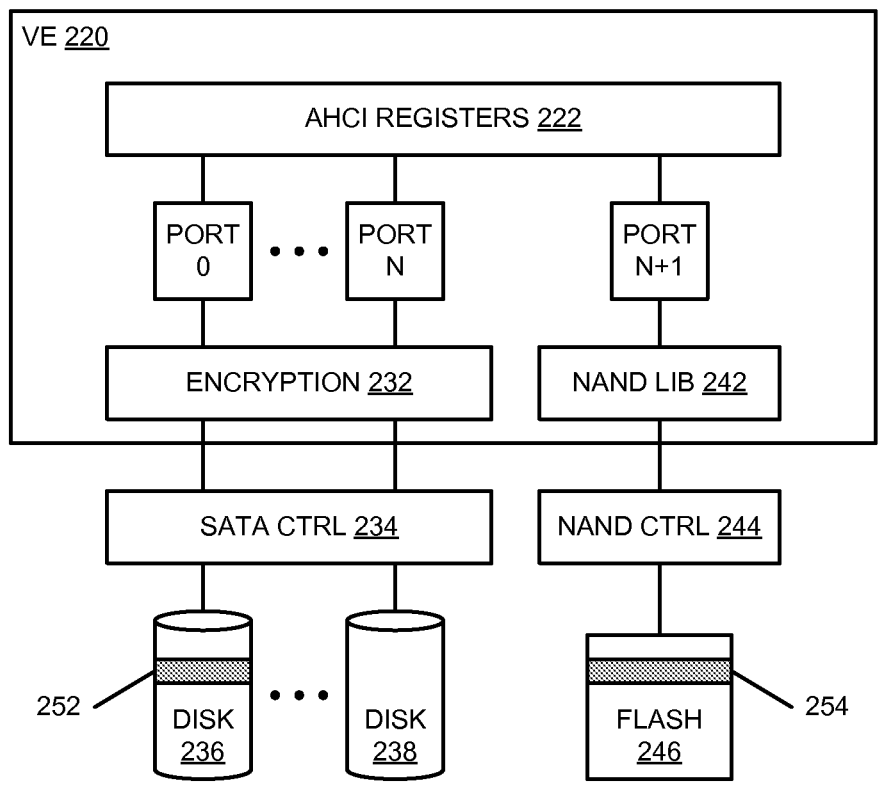
FIG. 2B is a block diagram of an embodiment of a virtualization engine.

FIG. 2B is a block diagram of an embodiment of a virtualization engine. VE 220 is one example of an implementation of a virtualization engine. Other implementations are possible. In one embodiment, VE 220 is firmware, or code that executes on one or more processing components of the peripheral controller of a computing device. In one embodiment, VE 220 includes a driver for an AHCI controller or equivalent disk or USB device access interface. The device interface includes configuration for storage devices in the host computing device. VE 220 may include the logic related to any disk or USB encryption functionality.

In one embodiment, VE 220 includes AHCI registers 222, which is an AHCI module that implements a driver backend inside VE 220. The host OS or its associated drivers (e.g., iMSM (Intel matrix storage manager) drivers) can access AHCI registers 222 to access SATA drives via VE 220. Thus, similar to ME 210 as described above, the host system may access VE 220 for purposes other than access to the hidden virtual partition. In addition to functions related to normal operation of the system as part of the hardware platform module, AHCI registers can be used by VE 220 to implement the hidden virtual partition inside a SATA disk drive. As shown, hidden virtual partition 252 is implemented inside disk 236.

The computing device includes a number N of ports available within the computing device for access to various disks. For example, certain current system include 6 SATA ports, or N=6. Each port may be individually controlled via configuration settings in AHCI registers 222. In one embodiment, encryption may be provided to data stored on the disks through encryption module 232. A common implementation in present systems is a Danbury encryption module. VE 220 interfaces with disks 236-238 via SATA controller (ctrl) 234. It will be understood that SATA controller 234 is not necessarily part of VE 220, and thus is represented separate from VE 220. SATA controller 234 is the controller for the SATA disks, which provides VE 220 access to disks 236-238. Data access to the disks is executed through VE 220. VE 220 can also control what the host system sees as available storage by reserving a partition hidden to the OS through configuration of AHCI registers 222. Thus, when reporting available storage, VE 220 may indicate only storage that is not reserved as a service partition, or may exclude indicating the storage reserved for the hidden virtual partition.

An additional port (illustrated as port N+1) can be used for flash 246. Flash library (lib) 242 is a module that implements the library or firmware/code needed to access flash memory 246. In one embodiment, flash 246 is a NAND flash device, in which case the library would include logic for accessing a NAND memory. Differences in technology can be addressed with appropriate library selection. In addition to access to flash 246 for regular access to the flash, such as that which can be performed by the host system, flash library 242 is also used by VE 220 to create a separate partition 254 for E-3PDS inside flash 246.

The separate partition is a virtual partition which stores data from hidden virtual partition 252 on disk 236. In one embodiment, partition 254 is not necessary for implementing a hidden virtual partition, but may be used to store data for low power OOB access via a remote service interface. Low power access is possible through flash 246 because it can be accessed with minimal power usage, whereas access to disk 236 requires the disk to be powered. Typically, disk 236 will only be powered when the entire hardware platform is powered and active, which is not a low-power state. Flash controller 244 is the controller for flash memory 244, and provides access to VE 220 to the flash.

In an embodiment where partition 254 is used for low-power access, data in the partition is copied back into the hidden virtual partition 252 on disk 236 by ME 210 when the computing device system comes back into a normal power state. The interaction is described in more detail below with respect to FIG. 3.

As illustrated and described, a portion of a hard disk drive may be partitioned for uses as a hidden virtual partition. VE 220 reserves the specific partition, in accordance with settings (e.g., size of the partition) requested through the ME (e.g., ME 210 of FIG. 2A). Additionally, provisioning a portion of nonvolatile storage can include reserving a portion of flash 246. In one embodiment, the primary purpose of partition 254 of flash 246 is for access in low-power states of the hardware platform.

Figure 3:
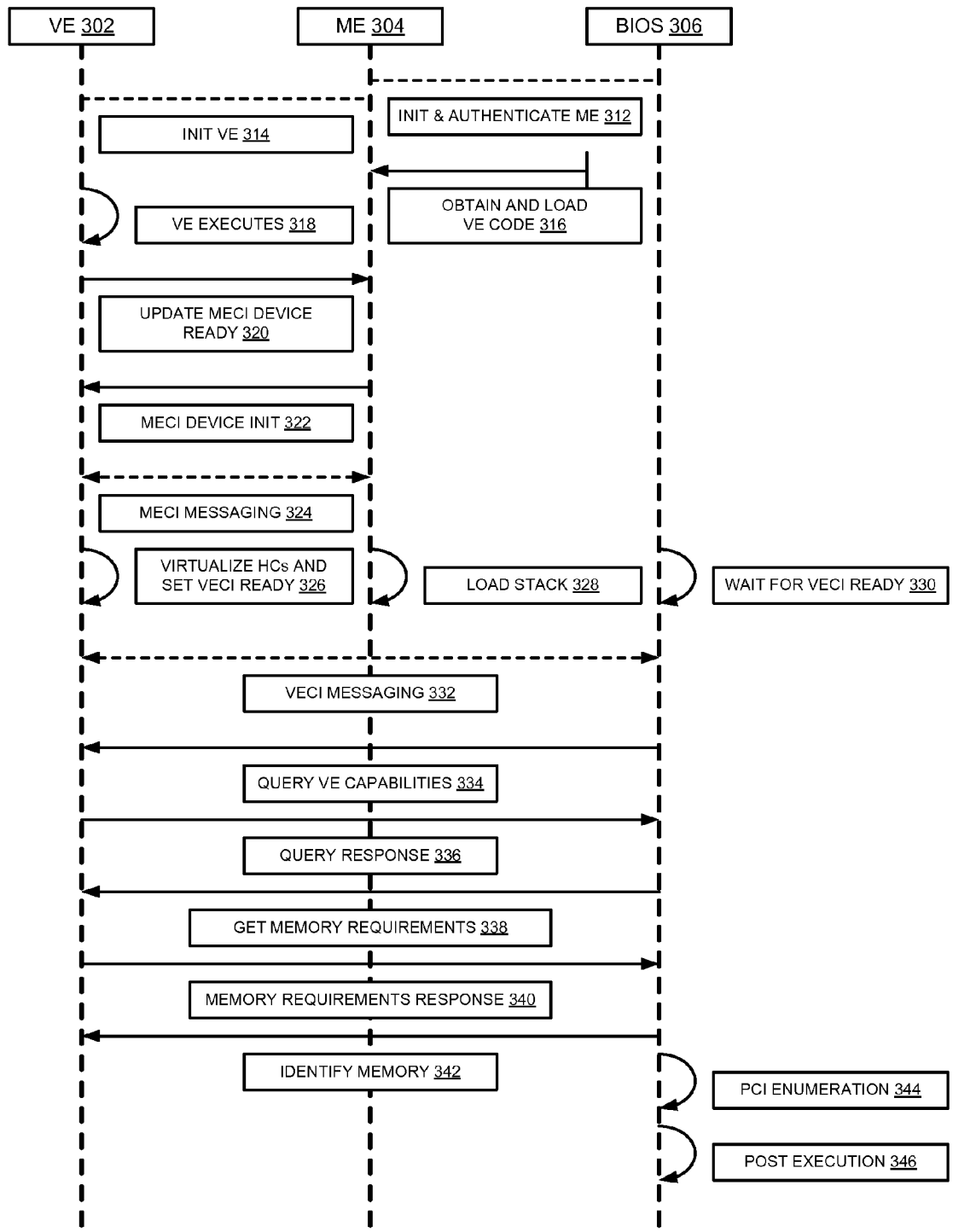
FIG. 3 is a flow diagram representation of an embodiment of communication in a system with a hidden partition.

FIG. 3 is a flow or communication exchange diagram representation of an embodiment of communication in a system with a hidden partition. More particularly, the diagram illustrates one example of a low power state (Sx) to normal power state (S0) state transition for a system with a hidden virtual partition. Thus, the state transition is Sx→S0. VE 302 interfaces with the physical storage device(s) (hard drives and/or flash), ME 304 directs the use of the hidden virtual partition, and BIOS 306 represents a host system that may be active for a normal power state (S0). ME 304 loads and starts up VE 302 during the state change.

Initially ME 304 initializes and authenticates itself with the system, 312. The initialization of ME 304 may also include initializing hardware platform components. ME 304 initializes VE 302, 314, which may occur by obtaining and loading the VE code, 316. In one embodiment, code for VE 302 is stored on a flash drive in the platform. VE 302 begins to execute, 318, when loaded. The VE may initially update a MECI (or equivalent) configuration setting to indicate or request a device ready state, 320. Reference herein to MECI will be understood as one possible example, and other control interfaces may be used. ME 304 may determine whether the device or devices to implement the MECI link is/are available. The ME then directs initialization of the MECI device(s), 322

Once the MECI device is initialized, MECI messaging can be performed between VE 302 and ME 304, 324. VE 302 retrieves virtualization descriptors from the service partition and virtualizes the host controllers (HCs) of the hardware platform per the descriptions, 326. Thus, storage access is performed through virtual interfaces rather than requiring specific hardware for each controller. The virtualization allows for flexibility in the interfacing, while enabling the use of hidden virtual partitions. Additionally, VE 302 sets a configuration setting related to enabling VECI (or equivalent) messaging, 326, which enables the host to access the storage through the provisioned virtual controllers. Similar to what is discussed above, VECI will be understood as one possible example, and other control interfaces may be used. ME 304 preloads TPM (trusted platform module) information, along with a privilege kernel for TPM operation, and a non-privilege kernel for normal operation. Additionally, ME 304 loads a support stack to manage operation of the hardware platform, 328. BIOS 306 becomes active as the hardware platform is initialized, and awaits the VECI messaging platform or equivalent to become available, which will enable the BIOS to access storage, 330.

When the VECI messaging becomes available, BIOS 306 accesses storage for data and code, and can begin messaging with VE 302. Note that up through VECI messaging 332, the computing system is in a low-power state (Sx), and the BIOS and the hard drives are not available, or are being initialized for access. The computing system then transitions into normal power mode (S0), and the host system can access the storage through VE 302.

Thus, the BIOS may query the VE capabilities to know what controllers are available and what services can be accessed through the hardware platform, 334. The VE capabilities will be those associated with access to storage and potentially other peripheral devices. VE 302 responds by indicating its capabilities, 336. BIOS 306 may then query the memory and storage requirements for the system, 338, to which VE 302 responds with the requirements, 340. The BIOS identifies the memory in the system, 342. BIOS 306 may then enumerate devices on a PCI (peripheral component interface) bus, 344, and execute a power on self test (POST), 346. VECI messaging may continue for normal system operation after the POST is completed.

It will be understood that the messaging described above could describe an initial power on of the system or a transition of the system from a low power to a normal operation state.

Figure 4:
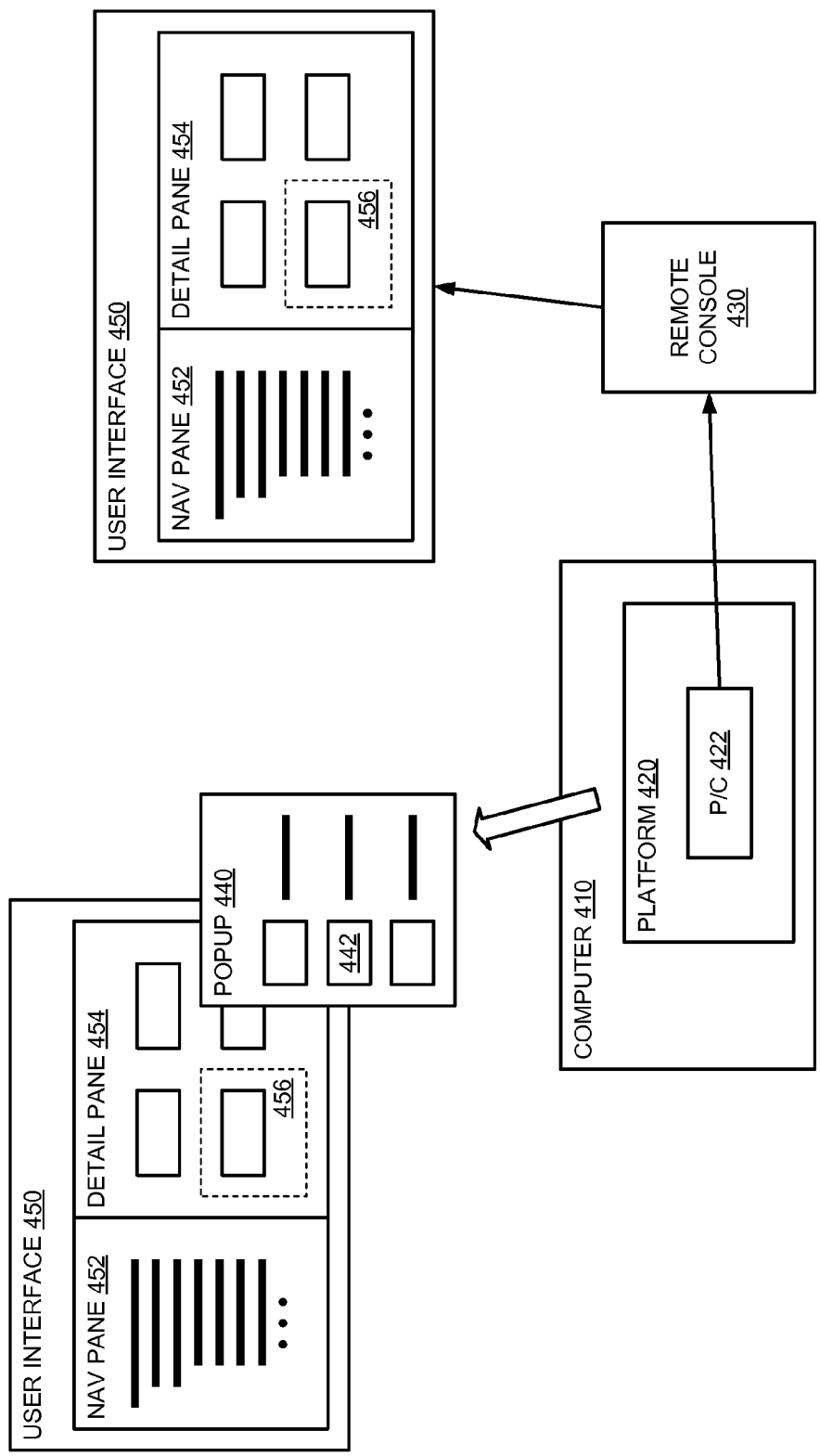
FIG. 4 is a block diagram of an embodiment of a hidden partition mounted as a drive on a universal serial bus (USB).

FIG. 4 is a block diagram of an embodiment of a hidden partition mounted as a drive on a universal serial bus (USB). Computer 410 represents a computing device having mechanism on peripheral controller (P/C) 422 of hardware platform 420. Peripheral controller 422 represents a platform control hub or PCH, which may include a VE and an ME, as described above. Mechanisms include platform configuration (e.g., registers and associated logic) to create and manage a hidden virtual partition or service partition.

In one embodiment, the creating and configuring of a service partition includes configuring the partition to be accessed as a USB device or drive. Thus, access to the partition from remote console 430 can initiate popup 440, which is a popup generated by computer 410 whenever a USB device becomes available. For example, plugging a device into computer 410 via a USB port would generate popup 440, where the popup would provide a list of potential devices and/or options with the device. In a similar manner, access to the service partition over an OOB communication interface via remote console 430 can likewise initiate popup 440. The partition shows up as item 442 in the window.

It will be understood that the OOB communication is a secure connection, accessible through password or other keys or credentials, but not otherwise available. Similarly, access to the partition may be secured. Thus, the service partition may appear on a user interface executing under the host system, but still not be directly available through the host system. Rather, the ME may generate the interface and trigger it to appear in the user interface by indicating the partition directly to a filesystem user interface, represented by user interface 450. An identical user interface to that executing on computer 410 may be accessible and viewable on remote console 430. Through popup 440 and the filesystem representation of the partition, remote console 430 can access and manage the partition.

The filesystem user interface 450 typically includes panes or sections such as navigation (nav) pane 452 that provides an overview of the filesystem, and detail pane 454, which can indicate specific information about one or more selected item from navigation pane 452. Specifically illustrated in detail pane 454 is item 456, which represents the service partition. It will be understood that access to the service partition cannot be initiated by the host system, and cannot be viewed by user interface 450 until initiated from remote console 430. Even after initiated, access to the service partition is available only through the secure communication channel of the OOB channel directly through platform 420. Thus, while the partition may be "viewed" in a convenient manner through standard interfaces executing under the host system, the partition can only be accessed in a secure manner. Therefore, the partition still remains separate from the host OS.

Figure 5:
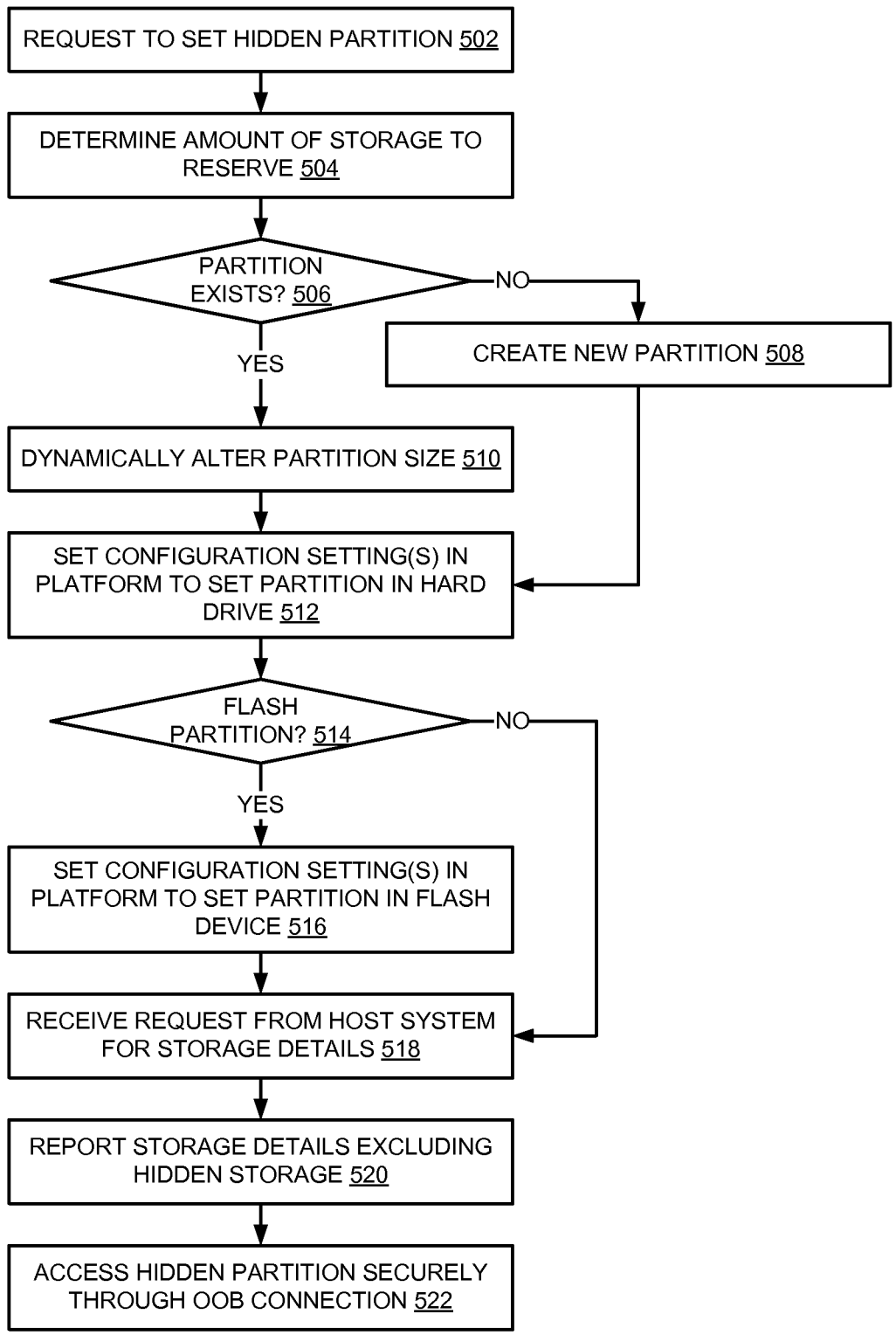
FIG. 5 is a flow diagram of an embodiment of reserving a hidden partition via a system platform.

FIG. 5 is a flow diagram of an embodiment of reserving a hidden partition via a system platform. Flow diagrams as illustrated herein provide examples of sequences of various process actions, which may be performed by processing logic that may include hardware, software, or a combination. Although shown in a particular sequence or order, unless otherwise specified, the order of the actions can be modified. Thus, the illustrated implementations should be understood only as an example, and the process can be performed in a different order, and some actions may be performed in parallel. Additionally, one or more operations can be omitted in various embodiments of the invention; thus, not all actions are required in every implementation. Other process flows are possible.

A hardware platform receives a request to set or reserve a hidden partition, 502. The request can be to alter the setting of an existing partition, or to create a partition. Generally an ISV would only have one such hidden partition in a computing system, or a section of a single hidden partition. The request should indicate how much storage to reserve as a hidden partition, or will rely on defaulting to a default or preconfigured amount of storage. Thus, the platform determines an amount of storage to reserve for the hidden partition, 504.

If a partition does not exist, 506, a new partition is created, 508. If a partition does exist, 506, the platform controller can dynamically alter the partition size, 510. The requests to create or change a partition would be received at a manageability controller or engine, which would then request or command a virtualization engine or controller to perform the provisioning of the partition. The virtualization engine can effect the changes to the system by changing configuration settings, which can effectively set up virtual partitions that are mapped in the virtualization control logic. Thus, the platform sets one or more configuration settings in the platform to set the partition in the hard drive to the desired or determined amount, 512.

In one embodiment, a flash partition may be created in addition to a partition in a disk drive. If a flash partition is requested, 514, the flash partition may be useful in low-power states of the host computing device. Similar to setting the partition in the disk drive, the platform sets one or more configuration settings in the platform to set a partition in a flash device, 516. If a flash partition is request, 514, 516, or not, 514, the platform configures the system and awaits a request by the host for storage device details.

When the platform receives a request for storage details from the host system, 518, the platform reports the storage details of the system excluding or adjusted for the hidden storage, 520. Thus, if 1 GB of a 100 GB drive is reserved as a hidden partition, the platform may have two sets of configuration. The first could indicate the actual configuration, which would account for all storage (100 GB), including the hidden partition. However, the platform would only report an adjusted configuration, which would exclude the hidden partition (99 GB). The host system would only know what is reported by the platform, and would have no way to discover the hidden partition, which is only accessed securely through an OOB connection, 522. More detail with respect to the access of the hidden partition is provided below with respect to FIG. 6.

Figure 6:
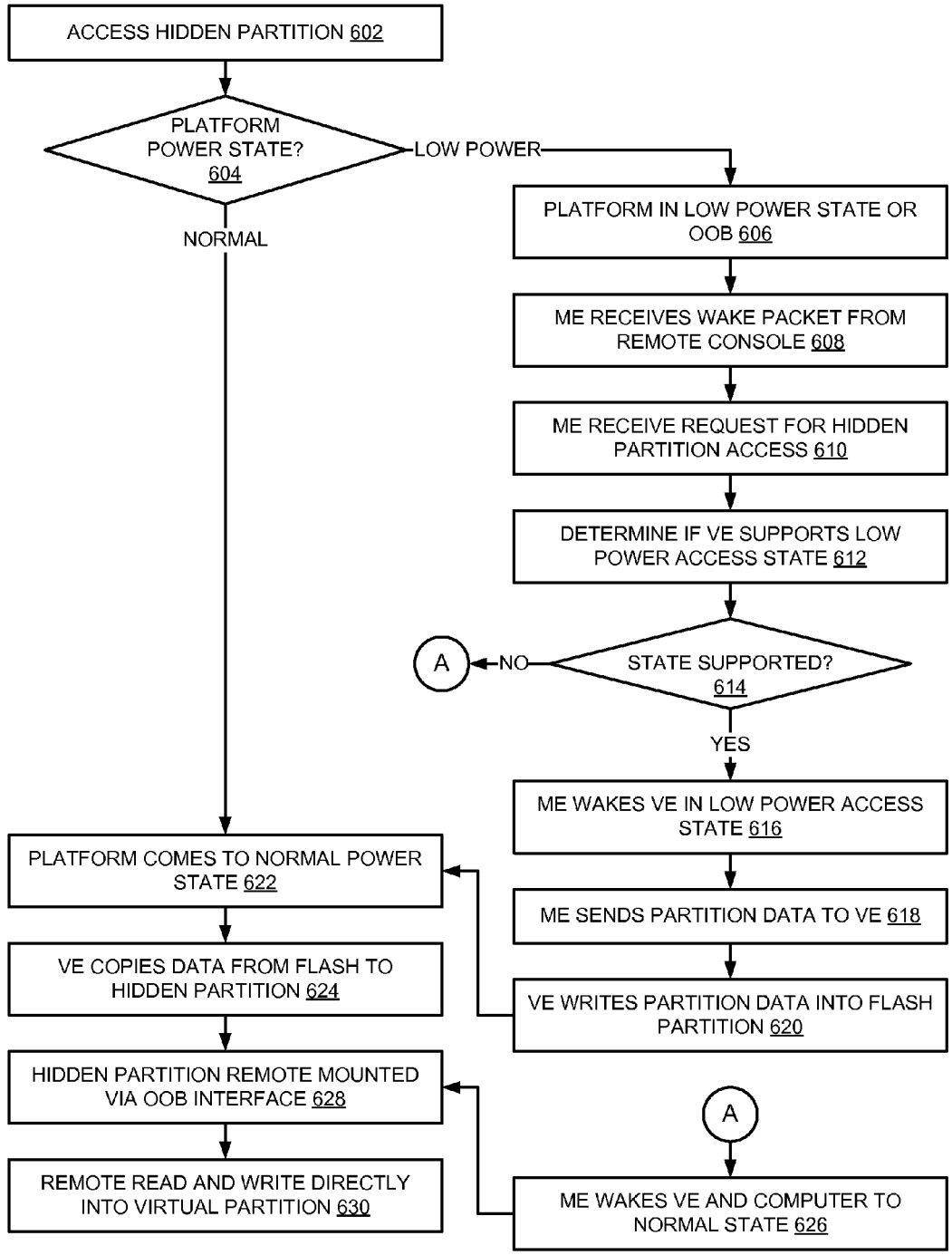
FIG. 6 is a flow diagram of an embodiment of accessing a hidden partition via a system platform.

FIG. 6 is a flow diagram of an embodiment of accessing a hidden partition via a system platform. As above, one or more operations could be optional in the flow diagram, and other flows are possible. An example of the flow of operation of the hidden virtual partition is as follows. An ISV or an administrator needs to access the hidden partition or 3PDS, 602. In one embodiment, the administrator determines what power state the platform is in, 604. In an alternate embodiment, the administrator requests access from the platform, which indicates what power state the platform is in.

If the computing platform is in a low power state, or if the platform is in a state that is indefinite or out-of-bounds (e.g., there has been a failure causing the host system to become inaccessible), 606, the remote console sends a wake packet to the platform, 608. For example, the remote console can send a specific command to an ME on the platform. The ME wakes and receives a request for access to the hidden partition, 610. The ME can also wake the VE and the platform. Whether the ME should wake the platform into low-power state or a normal state of operation depend on whether the VE supports low-power states. It is determined whether the VE supports low power access states, 612.

If the VE does not support a low power state, 614, the ME wakes the VE and the computer or the entire hardware platform to a normal state (e.g., S0), 626. If the VE supports a low power state, 614, the ME wakes the VE in a low power access state (e.g., S3), 616. In low power access, the ME sends the request for partition data to the VE, 618. The request can be sent to the VE over an MECI connection as discussed above. The VE writes partition or 3PDS data into the flash partition in low power access, 620. The read and write of data to the flash is performed by the VE by way of a flash interface, such as the flash library discussed above.

After writing the data into the flash, 620, or if a low power state is not supported, 604, the platform is brought to a normal power state, 622. Bringing the platform to a normal power state is consistent with bringing the platform up due to other user interaction. In one embodiment, the VE copies partition data from the flash to a hidden partition on a hard drive, 624. The copying of data from the flash to the hard drive can synchronize data in the two storage devices.

After copying data to the hard drive and coming into normal power state ready to have the hidden partition accessed, 624, or if the platform is awaken directly to normal power state, 626, the hidden partition can be remotely mounted via the OOB interface, 628. The administrator can directly mount the hidden partition via the VE and access the data of the hidden partition. Once remotely mounted, the administrator can remotely read and write directly into the virtual partition, 630. If the VE supports a low power access state, the partition data should be copied from the hidden partition in and out of the flash storage during power transitions to the normal power state to allow it to be accessed while keeping the power in a low power state. Thus, reading and writing directly into the virtual partition may involve reading and writing to both the hard drive section as well as the flash section that store the partition.

FIG. 7 is a block diagram of an embodiment of a hardware platform of a system that reserves a hidden partition. System 700 represents a "hardware view" of components of a computing device involved in managing a hidden virtual partition as described herein. System 700 includes one or more processors 710, which executes instructions and may perform various operations as described herein. Processor 710 may include any type of microprocessor, central processing unit (CPU), processing core, whether single or multi-core.

Processor 710 executes host OS 712 and one or more applications 714. These may include drivers for communication interfaces with hardware as discussed above. Multiple devices and/or peripherals may be connected to processor 710 via interface controller 720, which represents the hardware platform or peripheral interface platform discussed herein. In one embodiment, interface controller 720 includes multiple controllers, including VE 722 and ME 724. The function of each is discussed above.

In addition to what has already been discussed, it will be understood that the hardware platform or interface controller 720 includes one or more buses or interconnect systems, such as a Peripheral Component Interconnect (PCI) bus, a Hyper-Transport or industry standard architecture (ISA) bus, a small computer system interface (SCSI) bus, a universal serial bus (USB), and/or an Institute of Electrical and Electronics Engineers (IEEE) standard 1394 bus (commonly referred to as "Firewire").

Memory 730 represents the main memory of the system 700, and provides temporary storage for code (e.g., software routines or series of instructions, commands, operations, programs, data, etc.) to be executed by processor 710. Memory 730 may include read-only memory (ROM), flash memory, one or more varieties of random access memory (RAM), or the like, or a combination of such devices.

System 700 includes one or more internal storage device(s) 740, on which a hidden virtual partition is reserved. Storage 740 can be any conventional medium for storing large volumes of data in a non-volatile manner, such as magnetic, optical, and/or semiconductor-based disks. I/O 750 represents one or more input/output (I/O) interface(s) through which components of system 700 can connect with other electronic equipment, as well as interfaces with users such as video, audio, and/or alphanumeric interfaces. Network interface circuit/card (NIC) 760 represents hardware and software (e.g., drivers) that enable system 700 to communicate with remote devices over one or more networks. Processor 710 may execute various network stacks to control interfaces to various networks through network interface 760. Additionally, ME 724 may execute one or more network stacks to support an OOB connection via NIC 760 to a remote console.

BIOS 770 represents a system that may be used in booting or initiating system 700. BIOS 770 may be stored on a flash memory that is part of the hardware platform, or considered a separate component. Additionally, there may be other systems or peripherals connected to interface controller 720.

To the extent various operations or functions are described herein, they may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
receiving, by a hardware platform controller on hardware logic of a computing device separate from hardware logic that executes a host operating system (OS), a request to reserve a portion of storage on the computing device for a hidden partition, the request being received from a remote console over a secure out-of-band (OOB) communication channel, the secure OOB communication channel being hidden from the host operating system,
wherein the hardware platform controller is part of a peripheral interface hardware platform separate from host processor hardware that executes the host OS, the platform to provide connections for peripherals to the host processor of the computing device;
reserving the portion of storage on the computing device for the hidden partition including:
provisioning a first portion of a first nonvolatile storage device of the computing device and a second portion of a second nonvolatile storage device of the computer device to reserve the requested portion of storage for the hidden partition by setting one or more configuration parameters of the hardware platform controller to hide the first portion of the first nonvolatile storage device and the second portion of the second nonvolatile memory from the host OS, including changing an amount of storage space available to the host OS, wherein the first nonvolatile storage device is a hard drive and the second nonvolatile storage device is a flash storage device;
synchronizing data for the hidden partition including synchronizing data stored in the first portion of the first nonvolatile memory device with data stored in the second portion of the second nonvolatile memory device;
providing the remote console with secure remote access to the hidden partition via the secure OOB communication channel, remote access including providing remote access to the hidden partition via the secure OOB communication channel in a low power state of the computing device;
receiving a request for storage device details from a host system executing on the host processor hardware; and
reporting to the host system executing on the host processor hardware, in response to the request for storage device details, storage space of the nonvolatile storage excluding the portion of the nonvolatile storage reserved for the hidden partition, the reported storage space being different from an amount reported prior to the provisioning.

2. The method of claim 1, wherein receiving the request to reserve the portion of storage further comprises:
receiving a request to create a new hidden partition.

3. The method of claim 1, wherein receiving the request to reserve the portion of storage further comprises:
receiving a request from the remote console over the secure OOB communication channel to dynamically modify a size of an existing hidden partition; and
in response to the request from the remote console, dynamically altering the size of the hidden partition.

4. The method of claim 1, wherein receiving the request at the hardware platform controller comprises:
receiving the request at a manageability engine.

5. The method of claim 4, further comprising:
sending the request from the manageability engine to a virtualization engine that interfaces with the nonvolatile storage.

6. The method of claim 1, wherein the first nonvolatile storage device comprises:
one of a magnetic disk drive or a solid state drive (SDD).

7. The method of claim 1, wherein:
the flash storage device is operable to provide the remote access via the secure OOB communication channel to the hidden partition in the low-power state of the computing device, the hard drive being inaccessible in the low-power state.

8. The method of claim 1, wherein provisioning the portions of the first and second nonvolatile storage devices further comprises:
configuring the hidden partition to mount as a secure partition over a universal serial bus (USB) of the computing device, wherein the hidden partition is to be accessed as a USB device or drive.

9. The method of claim 8, wherein access to the hidden partition by the remote console is to initiate a popup, the popup being a popup that is generated by the computing device when a USB device becomes available.

10. The method of claim 1, wherein reporting to the host system comprises:
reporting to a BIOS (basic input/output system) of the computing device.

11. The method of claim 1, wherein:
providing remote access to the hidden partition includes receiving commands over the secure OOB communication channel from the remote console related to management of the hidden partition.

12. The method of claim 1, further comprising:
presenting, over the secure OOB communication channel to the remote console, the hidden partition as a storage device in a filesystem management application executing on the remote console; and
providing the remote access to the hidden partition via the secure OOB communication channel using the filesystem management application.

13. The method of claim 1, wherein synchronizing data stored in the first portion of the first nonvolatile memory device with data stored in the second portion of the second nonvolatile memory device includes:
copying data from the second portion of the second nonvolatile memory storage device to the first portion of the first nonvolatile memory storage device upon the computing device being transitioned from the low power state to a normal power state.

14. The method of claim 1, wherein security on the secure OOB communication channel is enforced through access control lists (ACLs) that enforce access to the storage space of the hidden partition.

15. An article of manufacture comprising a non-transitory machine readable storage medium having content stored thereon, which when accessed, provides instructions to cause a machine to perform operations including:
receiving a request to reserve a portion of storage on a computing device for a hidden partition, the request being received from a remote console over a secure out-of-band (OOB) communication channel, the secure OOB communication channel being hidden from a host operating system,
wherein the request is received at a hardware platform controller, the hardware platform controller part of a peripheral interface platform to provide connections for peripherals to a host processor of the computing device;
wherein the request is received by a hardware platform controller on hardware logic of a computing device separate from hardware logic that executes the host operating system (OS), the hardware platform controller part of a peripheral interface hardware platform separate from host processor hardware that executes the host OS, the platform to provide connections for peripherals to the host processor of the computing device;
reserving the portion of storage on the computing device for the hidden partition including:
provisioning a first portion of a first nonvolatile storage device of the computing device and a second portion of a second nonvolatile storage device of the computer device to reserve the requested portion of storage for the hidden partition by setting one or more configuration parameters of the hardware platform controller to hide the first portion of the first nonvolatile storage device and the second portion of the second nonvolatile memory from the host OS, including changing an amount of storage space available to the host OS, wherein the first nonvolatile storage device is a hard drive and the second nonvolatile storage device is a flash storage device;
synchronizing data for the hidden partition including synchronizing data stored in the first portion of the first nonvolatile memory device with data stored in the second portion of the second nonvolatile memory device;
providing the remote console with secure remote access to the hidden partition via the secure OOB communication channel, including providing remote access to the hidden partition via the secure OOB communication channel in a low power state of the computing device;
receiving a request for storage device details from a host system executing on the host processor hardware; and
reporting to the host system executing on the host processor hardware, in response to the request for storage device details, storage space of the nonvolatile storage excluding the portion of the nonvolatile storage reserved for the hidden partition, the reported storage space being different from an amount reported prior to the provisioning.

16. The article of manufacture of claim 15, wherein the first nonvolatile storage device comprises a hard drive of the computing device, and wherein the hard drive is one of a magnetic disk drive or a solid state drive (SDD).

17. The article of manufacture of claim 16, wherein:
synchronizing data for the hidden partition includes synchronizing the data stored in the second portion of the flash storage device and the first portion of the hard drive at a time of transitioning between low power operation and normal operation.

18. The article of manufacture of claim 15, wherein the content to provide instructions for reserving the portion of storage on the computing device for the hidden partition further comprises content to provide instructions for:
configuring the hidden partition to mount as a secure partition over a universal serial bus (USB) of the computing device, wherein the hidden partition is to be accessed as a USB device or drive.

19. The article of manufacture of claim 15, wherein the content to provide instructions for reporting to the host system comprises content to provide instructions for reporting to a BIOS (basic input/output system) of the computing device.

20. The article of manufacture of 15, wherein providing remote access to the hidden partition includes:
exchanging communication with the remote console over the secure OOB communication channel related to management of the hidden partition.

21. A computing device comprising:
nonvolatile storage including a first nonvolatile memory device and a second nonvolatile memory device, the first nonvolatile memory device being a hard drive and the second nonvolatile memory device being a flash storage device;
a processing unit to execute a host operating system (OS); and
a hardware platform separate from the processing unit that executes the host OS that interfaces peripheral devices with the processing unit, the hardware platform including a hardware platform controller that manages interfacing with the peripheral devices, the hardware platform controller to:
reserve a portion of storage on the computing device for the hidden partition in response to receiving a request from a remote console over a secure out-of-band (OOB) communication channel, the secure OOB communication channel being hidden from a host operating system, including the platform controller to:
provision a first portion of the first nonvolatile storage device and a second portion of the second nonvolatile storage device to reserve the requested portion of nonvolatile storage for the hidden partition by setting one or more configuration parameters of the hardware platform controller to make the first portion of the first nonvolatile storage device and the second portion of the second nonvolatile device inaccessible to the host OS, including changing an amount of storage space available to the host OS, wherein the first nonvolatile storage device is a hard drive and the second nonvolatile storage device is a flash storage device;
synchronize data for the hidden partition including synchronizing data stored in the first portion of the first nonvolatile memory device with data stored in the second portion of the second nonvolatile memory device;
provide the remote console with secure remote access to the hidden partition via the secure OOB communication channel, including providing remote access including providing remote access to the hidden partition via the secure OOB communication channel in a low power state of the computing device;

receive a request for storage device details from a host system executing on the host processor hardware; and report to the host system, in response to the request for storage device details, storage space of the nonvolatile storage excluding the portion of the nonvolatile storage reserved for the hidden partition, the reported storage space being different from an amount reported prior to the provisioning.

22. The computing device of claim 21, wherein the hardware platform controller comprises a manageability engine.

23. The computing device of claim 21, wherein the hardware platform further comprises:

a virtualization engine that creates virtual host controllers in the hardware platform to enable access to the peripheral devices of the computing device through the virtual host controllers.

24. The computing device of claim 21, wherein the first nonvolatile storage comprises one of:

a hard disk drive or a solid state drive (SDD).

* * * * *